455-609 AU 233 EX
FIP8106 XR 3,662,100

United States Patent

[15] 3,662,100
[45] May 9, 1972

Hollingsworth

[54] LASER TAPE RECORDING

[72] Inventor: R. Lee Hollingsworth, 110 Fox Boulevard, Massapequa, N.Y. 11758

[22] Filed: May 9, 1967

[21] Appl. No.: 637,157

Related U.S. Application Data

[63] Continuation-in-part of Ser. No. 396,842, Sept. 16, 1964.

[52] U.S. Cl. ....... 178/6.6
[51] Int. Cl. ....... G03g 19/00
[58] Field of Search ....... 178/5.4, 6.6 A

[56] References Cited

UNITED STATES PATENTS

| | | | |
|---|---|---|---|
| 2,750,438 | 6/1956 | Barco | 178/5.4 |
| 3,316,348 | 4/1967 | Hufnagel et al. | 178/6.7 |

*Primary Examiner*—Richard Murray
*Assistant Examiner*—Barry Leibowitz

[57] ABSTRACT

This is a tape recording system wherein the intelligence is supplied to the tape by means of a laser beam and involves means to direct and modulate the laser beam. The modulating means include the use of an electromagnetic reed, the circulation of magnetic dust particles around a continuous circular transparent channel through which the light beam is passed and a transducer to provide energy at that point.

4 Claims, 2 Drawing Figures

INVENTOR.
R. LEE HOLLINGSWORTH
BY
Jacobs & Jacobs
ATTORNEYS

LASER TAPE RECORDING

This is a continuation in part of my Application Ser. No. 396,842 filed Sept. 16, 1964 for VIDEO TAPE RECORDING, now abandoned.

This invention relates to the use of a laser beam, preferably a CW laser beam, directed toward a tape or other recording medium for recording the modulations thereon in the form of a series of parallel lines. The beam is directed to the tape by means of a rotating mirror or prism and is modulated and varied according to signal modulations from an electronic picture dissecting means such as a television camera. When recording transversely upon a moving tape, the mirrors draw straight lines across the tape in synchronism with the television line scanning. To vary or modulate the strength of the laser beam according to the modulations, an electromagnetic reed is provided as one means of modulation. The reed is moved in and out of the beam to vary the strength of the beam falling upon the mirror or prism which transmits it to the tape or other recording medium for the purpose of reproduction. It may be used for etching printing plates or rendering a stencil porous to the flow of ink or to make permanent light detectable and magnetic detectable recordings.

A further method to modulate the laser beam comprises a circulating cloud of dust preferably of metallic magnetic powder or magnetic flakes around a continuous circular transparent channel or tube which is preferably partially evacuated and where a portion of the channel has a high degree of convergence. An electrostatic or electromagnetic transducer is positioned to shift the passing elements from the wall area of the tube to vary the strength of the laser beam which then strikes the rotating mirror or prism.

The magnetic material making up the cloud or dust may consist of small bits of coated Mylar tape cut by stamping means or otherwise made into small pieces and is moved as fast as possible through the continuous channel or tube consistent with the ability of the transducer to vary the cloud path and, in turn, vary the laser beam strength. Where the laser beam flows or passes through a very small hole on its way to the scanning mirror, the dust particles may comprise reflective material to act both as light obstruction particles and as reflective particles to redirect the laser light to add to the degree of modulation of the beam.

A substitute for the laser beam may comprise a strong source of light which is lense focused and concentrated through a small hole to be then modulated and mirror scanned upon a viewing medium where the travel length of the light beam and the spread thereof is of no consideration.

The propelling means within the channel or tube carrying the cloud of magnetic particles is preferably a three-quarter wave vibrating blade or paddle means for agitating and moving the cloud of particles rapidly past the transducer. Opposed magnetic fields may also be employed to converge the magnetic particles past the transducer. In fact, any propelling means such as a small propeller may be used to move the dust at the desired rate. Where the television transmission channel is limited to a given bandwidth or where a video recording system has difficulty in full bandwidth recording, the system of the present invention may well be used as more economical in the cost of making recordings.

The preliminary description of the invention follows.

Figure 1:
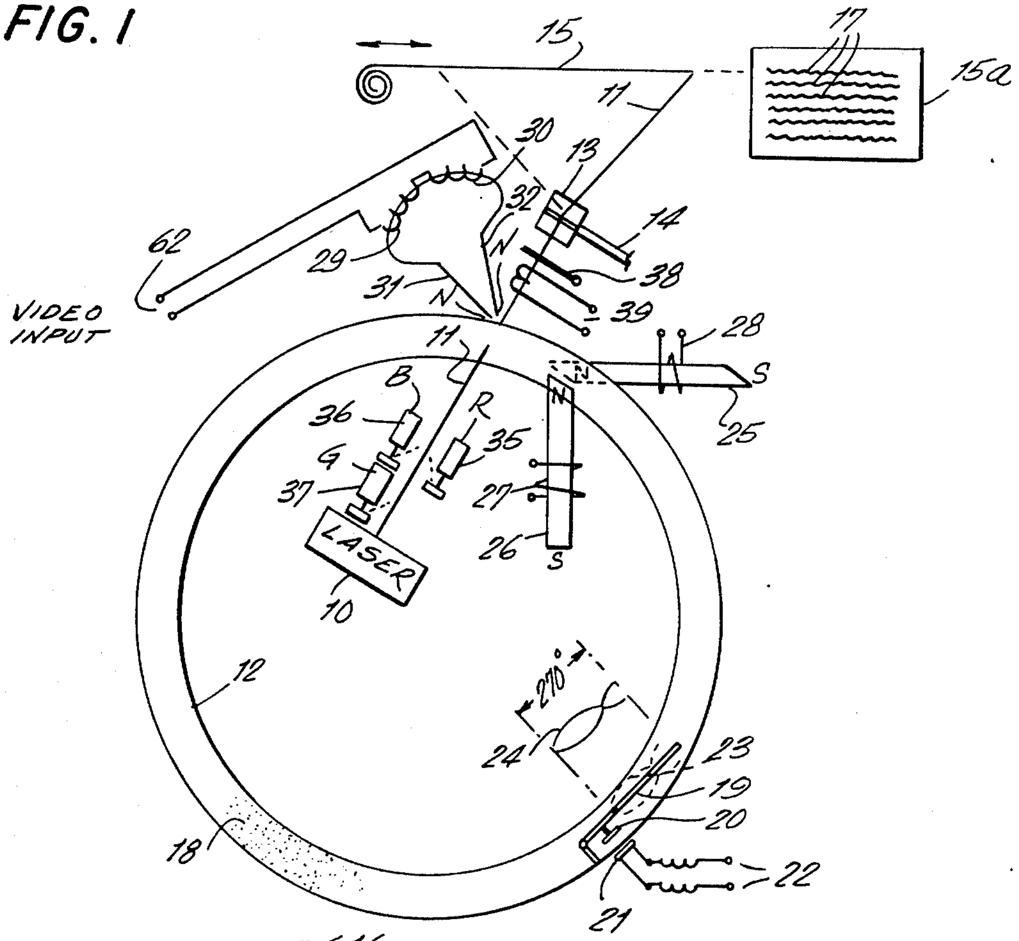
FIG. 1 is a plan view showing the details comprising the amplitude and modulation means for varying the beam.

Referring more particularly to the drawings, FIG. 1 is a laser beam (or concentrated light beam) generator is indicated at 10 and the beam 11 passes through the transparent circular tube 12 and strikes the rotating mirror 13 or rotating prism 16 mounted on the shaft 14. The beam is directed by the mirrors or prism to the moving tape 15 to produce repeating lines transversely across the tape. In recording television signals, it is desirable to record one line across the tape corresponding to each scanned horizontal picture line to simplify reading out the information from the tape after recording is made. However, each transverse line may contain a plurality of scanned television lines and synchronizing signals if great care is given to the precise movement of the tape and particularly if the tape is moved and controlled by synchronizing and scansion signals printed magnetically on the tape.

When it is desired to reproduce televised presentations as illustrated on the frame 15a, a mirror drum 16 or rotating prism means is used instead of the mirrors 13 each angled to provide the framed area 15a which shows horizontal lines at 17.

The laser beam has considerable power of penetration for exposure or other purposes. Therefore, drawing sketches and printed pictures made on paper that could not be exposed to reproduction heretofore can be placed in an area such as 15a with light-sensitive paper beneath and scanned by the laser beam. Exposure is readily accomplished on photographic paper, Polaroid films and the more commonly used film negatives. A desirable and durable stencil may be made by placing a sheet of thin metal or Mylar plastic tape in area 15a to be scanned by the laser beam under control of television or high speed facsimile scanning signal modulations to punch holes in the material according to the intelligence of the signals. Stencils having this degree of durability may be clamped around a printing cylinder to accommodate the passage of pressurized ink for the purposes of high speed printing. Duplicator stencils made in this manner are long lasting and capable of utilizing pressure ink feed supply on a duplication machine to provide high speed, high quality office and institutional printing requirements.

In order to modulate the beam, the hollow transparent pipe 12 through which the beam passes contains a quantity of magnetic powder or crystals 18. Means to agitate the powder into a dust cloud and move the cloud continuously around the endless pipe 12 includes a vibrating limber reed 19 having a magnetic drive element 20 attached thereto which cooperates with the electromagnet 21 mounted on the outside of the pipe or tube 12 and supplied with 60 cycle alternating current to cause the reed 19 to vibrate in a manner indicated by the dotted curve line 23 and further illustrated by the reverse curve 24 which shows the reed atuned and driven to vibrate at the 270° mode or three-quarters of a wavelength. This has been found to be the mode that drives the largest volume of liquid and gas and is symbolic of the wave mode used by fishes as they swim. Other means for agitating the magnetic powder may be used such as a motor driven propeller. To assist in propelling the magnetic powder and to concentrate the cloud particles to pass through the laser beam at least one pair of electromagnets 25 and 26 are placed on the outside of the tube 12 near the laser beam as it passes through the tube or pipe 12. These are excited by energy supplied by electric windings 27, 28 and phased to produce opposed north magnetic poles to provide directional magnetic thrust to move the magnetic cloud elements. The energy is preferably rectified before being applied to windings 27, 28 to keep the magnetic projections in the same direction. They may, of course, be permanent magnets with their north poles positioned to produce the said projection of magnetic energy. The coils 27, 28 may also be supplied with the same video energy that is supplied to transducer terminals 62 to assist in the total movement of the magnetic dust cloud across the laser beam to modulate the beam.

The video energy supplied to the terminal 62 flows through coils 29 and 30 in opposite directions to generate north poles at the point of the horseshoe magnet composed of arms 31, 32, the energy being preferably rectified for the reasons stated above. In operation, the beam energy is trying to pass through the magnetic particles of the cloud as the magnetic energy from the transducer 30 and/or the magnets 25 and 26 bunches and unbunches and moves the particles into and out of the laser beam to vary the strength thereof according to the video energy. If the pipe or tube 12 is partially evacuated, it allows particles to be easily moved and at a more rapid rate by the magnetic modulations.

Figure 1A:
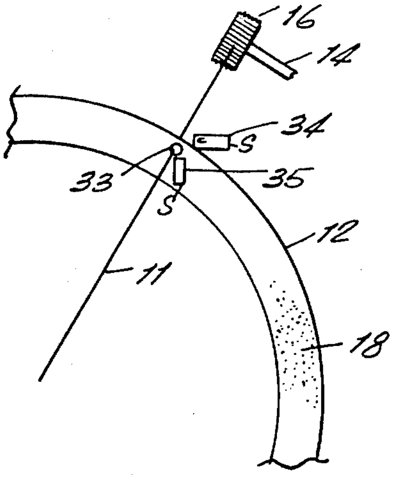
FIG. 1a is a sectional view showing permanent magnets confining magnetic dust within an otherwise closed area where a laser beam passes through holes in the walls of the dust container and/or through a hole in one of the magnets.

FIG. 1a shows a cut away section of pipe 12 having a small hole 33 to allow the laser beam 11 to pass through the cloud elements directly to the mirror drum 16 unimpeded by the transparency walled area of pipe 12. Magnets 34, 35 have their north poles fixed at the hole areas to prevent the magnetic particles of the cloud from escaping into the outside atmosphere. If it is desired, a small hole in the point of magnet 34 may allow the laser beam to pass therethrough so that the magnet prevents or opposes particles from escaping. Here the tube is not evacuated.

If television pictures, as displayed on unit 15*a*, are to be sent in color and are so transmitted, color filter means 35 labelled "R" for red; 36 labelled "Blue" for blue and 37 labelled "G" for green represent electromagnetically operated color shutters that change color of the laser beam according to the transmitted color signals. The dotted lines indicate movement of these filters so as to produce the change of color in the laser beam as the respective color signal is applied. It will be appreciated that the natural color of the laser beam may be at least one of the colors reproduced without being filtered.

For slow speed writing and reproducing such as in facsimile recording, cutting printing stencils and printing plates and the like, a reed shutter 38 on which the exciting coil 39 is mounted is supplied with modulations from a transducer pickup or dissecting means (not shown) such as a television camera, photocell means or the like. The energy supplied to the coil 39 causes the reed shutter 38 to move into, out of or through the laser beam 11 to vary the strength thereof or the number of times the beam is cut off according to the signal values applied to the coil 39. This cuts off or varies the intensity of the light striking the mirrors 13 and 16 to in turn produce the recording.

The foregoing description of the present invention is considered to be the setting forth of the elements and means for carrying the invention into use, and therefore, the substitution of known means for those recited to produce any of the broad range of products resulting from the invention is considered the equivalent of the invention as described and claimed here or hereinafter in the prosecution of this application for Letters Patent.

When "Recording" is used in this specification and in the following claims, it is intended to be all encompassing to completely penetrate a tape or recording medium to provide a light sensitive and/or magnetic sensitive recording; to remove or wrinkle magnetic coating from a carrier medium not penetrated by the laser beam; to etch in depth; to cause the laser beam to provide stencils in durable materials at high speeds; render grid control raster plates porous to the selective passage of beam electrons without retardation in a vertical raster type color producing cathode ray tube before assembly in such color tubes and many other applications.

What is claimed is:

1. A system for recording comprising a recording tape and transport means therefor, a laser beam of light directed upon a rotating mirror means through a hollow transparent endless pipe means, said mirror in its rotation placing straight lines transversely of said tape while the tape is in motion, a quantity of magnetizable powder contained within said pipe means and means to agitate and propel and rapidly circulate a dust cloud comprised of the elements of said powder past and through said laser beam, an electromagnetic transducer means with electric signals applied thereto positioned to interrupt the dust cloud elements to vary the strength of the laser beam in accordance with the variations of electric signals applied to said transducer means.

2. A system for recording comprising recording tape and transport therefor, a rotating mirror means, a laser beam of light directed upon said rotating mirror through a hollow transparent endless tube, a quantity of magnetizable powder contained within said tube and means to agitate and circulate a dust cloud composed of the elements of said dust powder, an electromagnetic transducer positioned to interrupt the dust cloud elements to vary the strength of the laser beam and thus to vary the strength of the beam upon the mirror.

3. A system for viewing and recording comprising a light sensitive tape and transport means therefore, a laser beam of light directed upon a rotating mirror means through holes in a hollow endless pipe means, said mirror means in its rotation places light energy lines upon a viewing area, material sensitive to laser light energy exposed in said area, a quantity of magnetic powder contained within said pipe means and means to agitate, propel and rapidly circulate a dust cloud comprised of the elements of said powder through said laser beam, transducer means with signals applied thereto positioned to interrupt the dust elements to vary the strength of the laser beam in accordance with the variation of the signals, said holes in said pipe means for direct passage of the laser beam through the moving cloud, and magnetic north poles of magnets positioned to prevent the escape of the dust particles from the said endless pipe means.

4. A system of light energy recording comprising a laser beam and means to modulate said beam, said means comprising an endless hollow transparent pipe, within said pipe a quantity of magnetic particles and means to generate thrust within said pipe to activate the said particles into a cloud and to move the cloud around the endless pipe, a laser beam positioned to pass through said pipe, transducer means positioned to project energy into the said laser beam area within said pipe to vary the particles passing through the said laser beam to vary the intensity thereof, a plurality of mirrors mounted upon a rotatable shaft and positioned to reflect the said laser beam to draw lines with rotation of said shaft transversely of a moving tape, said tape treated with materials to receive a permanent recording according to elements of electric energy supplied to said transducer means.

* * * * *